Patented Jan. 18, 1949

2,459,367

UNITED STATES PATENT OFFICE 2,459,367

1,4-DI(HETEROCYCLIC SUBSTITUTED) PIPERAZINES

John Joseph Denton, Somerville, and Kenneth Leon Howard, Westfield, N. J., assignors to American Cyanamid Company, New York, N. Y., a corporation of Maine No Drawing. Application November 12, 1947, Serial No. 785,527

7 Claims. (Cl. 260—251)

The present invention relates to 1,4-diheterocyclic substituted piperazines. More particularly, it relates to the preparation of 1,4-diheterocyclic piperazines and to the compounds so produced, the heterocyclic constituents being six membered rings, each of which contains one or two nitrogen atoms as hetero atoms.

More specifically, the present invention relates to new compounds of the general type formula:

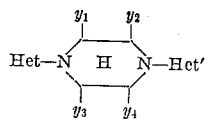

wherein Het represents a six membered heterocyclic radical, each containing one or two nitrogen atoms, such as, for example, the pyridyl, pyrimidyl, pyridazyl and pyrazyl radicals and/or, alkyl, halogen or hydroxy substituted members of the group; Het' is the same or a different radical selected from the members of the same group as Het; and $y_1$, $y_2$, $y_3$ and $y_4$ are either hydrogen or lower alkyl radicals.

In general, the di-substituted piperazines of the present invention are white to tan crystalline materials, only slightly soluble in water but readily soluble in the ordinary alkanols, chloroform, ether, lacquer-solvent esters, and, to varying extent, in hydrocarbon solvents such as VMP naphtha. The compounds are basic in character. Some, but not all, form well defined addition salts with acids such as hydrochloric, hydrobromic, sulfuric, citric, and the like. These salts, when capable of forming, are water-soluble and usually hygroscopic. Some are obtained as hydrated crystals.

Preparation of the novel compounds of this invention may be accomplished in several ways. Probably the preferred method consists in reacting piperazine, or a substituted piperazine, with a ring halogenated compound having the desired heterocyclic structure. However, the exact procedure will vary to some extent on the nature of the product to be obtained. Bis-compounds, for example, in which both Het and Het' are identical, may be prepared simply by reaction of piperazine with two molecular equivalents of the selected ring-halogenated heterocyclic compound. Where Het and Het' differ, successive reactions must be carried out. Usually a slight excess of the halogenated heterocyclic is helpful in securing improved yields.

The reactivity of the halogen-substituted heterocyclic compounds, which are utilized in the preparation of these 1,4-di(heterocyclic)-piperazines may vary considerably. It is dependent, for example, both upon the halogen radical and upon the heterocyclic radical. By way of illustration, 2-bromopyridine possesses a more reactive halogen radical than does 2-chloropyridine, yet 2-chloropyrimidine possesses a more reactive halogen radical than that of 2-bromopyridine. This may be compared with 2-chloropyrazine, however, which possesses a halogen radical less reactive than that of 2-chloropyrimidine.

This variation in reactivity of the halogenated heterocyclics allows considerable variation in the choice of reaction conditions in the preparation of the 1,4-di(heterocyclic) piperazines of the present invention. In some cases, therefore, these reactions may be carried out in the presence of an acid-accepting agent, such as sodium bicarbonate or sodium carbonate or the like, in a low-boiling alkanol solvent, such as ethanol or propanol. In other cases, the reaction may be more suitably carried out by heating the two reactants together without a solvent. In still other cases, it may be desirable to carry out the reaction under pressure in an autoclave at 150–250° C. in an aqueous or aqueous-alcoholic medium containing an acid-accepting agent such as sodium or potassium hydroxide or the like.

When a salt of the base can be formed and is desirable, it is readily prepared. The base may be purified and then converted to the salt or the salt be formed from the crude base and the product purified as the salt. Usually the latter is the simpler procedure and is generally preferable where a salt forms readily. The salt is obtained by acidifying a suitable solution of the base. It is only necessary to treat that solution with an excess of the salt-forming acid. This is done by adding an excess of an acid solution to the solution of the base or if the acid is a gas it may be simply bubbled therethrough, the salt being precipitated, collected and purified in accordance with the usual procedures.

Among the new compounds of the present invention may be listed those in which the group designated Het in the general formulation is 2, 3 or 4 pyridyl or in which either or both Het and Het' is 2 pyrazyl, 3 or 4 pyridazyl or 2, 4 or 5 pyrimidyl. The compounds of the present invention being 1,4-substituted piperazines, the latter ring is shown as saturated. However, in addition to the 1,4-substituents, the carbon atoms of the ring may also be substituted. As shown in the generic formula above, any or all of $y_1$, $y_2$, $y_3$ and $y_4$ may be either hydrogen or a lower alkyl group, particularly the methyl and ethyl radicals. The invention therefore contemplates 1,4-disubstituted mono-, di-, tri-, and tetra-alkyl piperazines such as 2-methyl or ethyl piperazine, 2,5- and 2,6-dimethyl and diethyl piperazines and tetramethylpiperazine. Many of these compounds have useful pharmacologically active properties. The bis-pyrimidyl compounds, for example, are active as anticonvulsants and the 1,4-di(2-pyrazyl) compound is extremely active as an analgesic. None exhibit an excessive acute toxicity in test animals.

Preparation of the compounds of the present invention is more fully shown in conjunction with the following illustrative examples. All parts are by weight unless otherwise noted.

EXAMPLE 1

*1,4-bis(2-pyridyl)piperazine*

A suspension of 46.5 parts of piperazine and 69.6 parts of 2-bromopyridine is heated to 100° C. whereupon an exothermic reaction occurs and the temperature rises rapidly to the boiling point, 240° C. When the exothermic phase of the reaction subsides, the reaction mixture is heated at 185±5° C. for about an hour. The resultant solid mass is slowly cooled and leached with 30 parts of water. The insoluble tan-colored granulated residue is separated from the dark-colored solution by filtration and air-dried. This tan colored solid is dissolved in hot butanol, treated with decolorizing charcoal, filtered and recrystallized to give a light tan solid, M. P. 124–126° C.

EXAMPLE 2

*1,4-bis(2-pyridyl)piperazine dihydrochloride hemihydrate*

A sample of 1,4-bis(2-pyridyl)piperazine prepared as in Example 1 is dissolved in warm absolute ethanol and treated with an excess of HCl in absolute alcohol. A slightly off-white solid product precipitates and is isolated by evaporation and filtration. After one recrystallization from n-butyl alcohol, this salt darkens at 265° C. and melts at 273–275° C.

EXAMPLE 3

*1,4-bis(2-pyrimidyl)piperazine dihydrochloride*

To 30.5 parts of piperazine is added 480 parts 8.5% sodium hydroxide solution. The solution is warmed to 70° C. and 19.4 parts 2-chloropyrimidine is added portionwise during one-half hour. The solid material which separates from the cold solution is washed, dried and dissolved in methanol. Treatment of the methanol solution with excess hydrogen chloride yielded a yellow crystalline solid which melts and distills simultaneously at 258° to 260° C.

EXAMPLE 4

*1,4-bis(2-pyrazyl)piperazine*

A mixture of 30.5 parts of piperazine, 90.4 parts 2-chloropyrazine and 80 parts of 50% aqueous sodium hydroxide solution is heated and shaken at 200° C. in an autoclave for five hours. The reacted mixture contains a partially-crystallized material which is separated from the mixture by filtration. The moist filter cake is extracted with hot n-butyl alcohol. Partial solvent removal from the extract produces product which when crystallized from the cold butanol melts at 197–198° C. A hydrochloride of this product obtained by treating an ethanol solution with alcoholic HCl is poorly defined and has no definite melting point.

EXAMPLE 5

*1-(2-pyridyl)-4-(2-pyrimidyl)piperazine*

To a suspension of 15 parts of sodium bicarbonate and 16.4 parts of 1-(2-pyridyl)piperazine in 500 parts of absolute alcohol is added 11.5 parts of 2-chloropyrimidine. The reaction mixture is heated, with stirring, at reflux temperature for about one hour, and filtered while hot. Upon standing, a crystalline product separates from the filtrate and is collected by filtration as 17.2 parts of a product which melts at 105°–106° C. The product is dissolved in acetone and treated with an excess of hydrogen chloride in ethanol. The resultant hydrochloride, after recrystallization from a mixture of methanol and ethylacetate yields a hydrochloride which darkens at 257° C. and melts at 268–272° C. with decomposition.

EXAMPLE 6

*1,4-bis(2-pyrimidyl)-2,5-dimethylpiperazine*

The procedure of Example 3 is repeated but using an equivalent amount of 2,5-dimethylpiperazine instead of piperazine. The product 1,4-bis-(2-pyrimidyl)-2,5-dimethylpiperazine is obtained. Treatment with alcoholic HCl in excess yields the dihydrochloride.

We claim:

1. 1,4-diheterocyclic substituted piperazines of the type formula

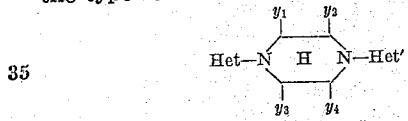

in which Het and Het' are members selected from the group consisting of the pyridyl, pyrimidyl, pyridazyl and pyrazyl radicals, the bond being to a

linkage, and $y_1$, $y_2$, $y_3$ and $y_4$ are selected from the group consisting of hydrogen and the lower alkyl radicals, and salts of said piperazines.

2. 1,4-diheterocyclic substituted piperazines of the type formula

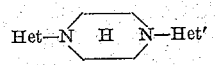

in which Het and Het' are members selected from the group consisting of the pyridyl, pyrimidyl, pyridazyl and pyrazyl radicals, the bond being to a

linkage, and salts of said piperazines.

3. A 1,4-diheterocyclic substituted piperazine according to claim 2 in which Het' is pyrimidyl radical, the bond from the piperazine being to a

position in the heterocyclic ring.

4. A 1,4-diheterocyclic piperazine according to claim 2 in which Het' is a pyrazyl radical, the bond from the piperazine being to a

position in the heterocyclic ring.

5. A 1,4-diheterocyclic piperazine according to claim 2 in which Het and Het' represent a pyrazyl radical.

6. A method of preparing 1,4-diheterocyclic piperazines of the type formula

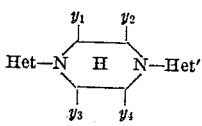

in which Het and Het' are members selected from the group consisting of the pyridyl, pyrimidyl, pyridazyl and pyrazyl radicals, the bond being to a

linkage, and $y_1$, $y_2$, $y_3$ and $y_4$ are selected from the group consisting of hydrogen and the lower alkyl radicals, which comprises reacting, in the presence of a basic acceptor for hydrogen halides, a substituted piperazine of the type formula

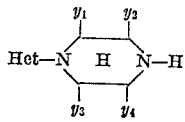

and a ring halogenated member of the group consisting of pyrimidine, pyridazine, and pyrazine, separating the resultant disubstituted piperazine from the reaction mixture and purifying the separated piperazine.

7. A method of preparing 1,4-diheterocyclic piperazines of the type formula

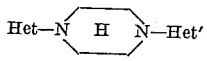

in which Het and Het' are members selected from the group consisting of the pyridyl, pyrimidyl, pyridazyl and pyrazyl radicals, the bond being to a

linkage, which comprises reacting, in the presence of a basic acceptor for hydrogen halides, a substituted piperazine of the type formula

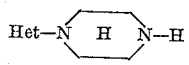

and a ring halogenated member of the group consisting of pyrimidine, pyridazine, and pyrazine, separating the resultant disubstituted piperazine from the reaction mixture and purifying the separated piperazine.

JOHN JOSEPH DENTON.
KENNETH LEON HOWARD.

No references cited.